United States Patent Office 3,432,700
Patented Mar. 11, 1969

3,432,700
ELECTRIC MOTOR AND METHOD OF MANUFACTURE BY HIGH SPEED DEFORMATION
Artur Diederichs, Wurzburg, Germany, assignor to Siemens Aktiengesellschaft Berlin-Siemensstadt, Germany, a corporation of Germany
Filed Sept. 20, 1966, Ser. No. 580,661
Claims priority, application Germany, Sept. 25, 1965, S 99,670
U.S. Cl. 310—42
Int. Cl. H02k 15/00
10 Claims The present invention relates to a method of manufacture of an electric motor. More particularly, the invention relates to a method of manufacture of an electric motor by high speed deformation.

The principal object of the present invention is to provide a new and improved method of manufacture of an electric motor. The method of manufacture of the present invention utilizes high speed deformation. The method of manufacture of the present invention is efficient, effective and reliable in operation. The electric motor produced by the method of manufacture of the present invention utilizes parts which are not press fit and do not have to meet close tolerances.

In accordance with the present invention, a method of manufacture of an electric motor comprises the steps of affixing a rotor to a shaft and positioning a pair of spaced bearings on opposite ends of the shaft. A stator is positioned around the rotor. Support brackets are affixed to the stator and to the bearings to affix the stator to the bearings. Rings are positioned around the support brackets around the stator and around the support brackets around the bearings. The rings are closed and tightened around the stator and around the bearings by a high speed forming process.

An electric motor produced by the method of the present invention comprises a shaft. A rotor is coaxially affixed to the shaft. A pair of spaced bearings are positioned at the opposite ends of the shaft. A stator is coaxially positioned around the rotor with an air gap therebetween. Support brackets are affixed to the stator and to the bearings for affixing the stator to the bearings. Rings are closed and tightened around the support brackets around the stator and around the bearings.

In order that the present invention may be readily carried into effect, it will now be described with reference to the accompanying drawing, wherein.

Figure 1:
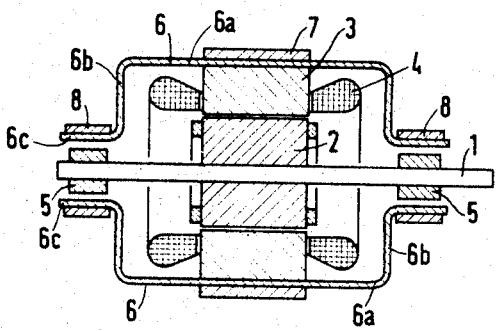
FIG. 1 is an axial sectional view of an embodiment of an electric motor produced by the method of manufacture of the present invention.
Figure 2:
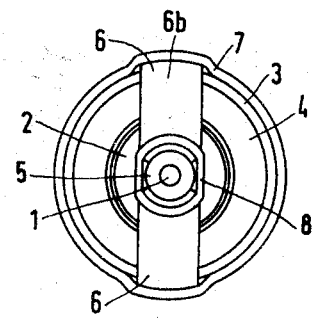
FIG. 2 is an end view of the embodiment of FIG. 1.
Figure 3:
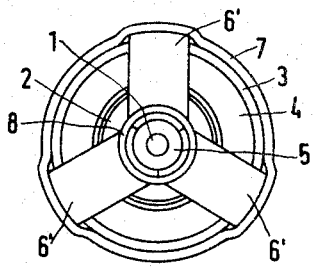
FIG. 3 is an end view of a modification of the embodiment of FIG. 1.

The electric motor of FIGS. 1, 2 and 3 may comprise an induction motor having a shaft 1, a short circuit rotor 2 coaxially affixed to said shaft and a stator 3 comprising a plurality of stator laminations. The stator 3 has an end turn 4. The shaft 1 is rotatably positioned in a pair of spaced bearings 5. The bearings 5 are supported by support brackets 6.

As many support brackets 6 as suitable may be utilized. Thus, in FIG. 2, two support brackets 6 angularly spaced 180° from each other are utilized, and in FIG. 3, three support brackets 6' angularly spaced 120° from each other are utilized. Each of the support brackets 6 and 6' is the same and is of substantially U-shaped configuration, as shown in FIG. 1, with additional stem portions extending therefrom. Thus, each support bracket is substantially wide ribbon-like and has a long head portion 6a, a pair of relatively short spaced stems 6b each extending substantially perpendicularly from a corresponding one of the ends of the head portion and a pair of relatively short additional stem portions 6c each extending substantially perpendicularly from the end of a corresponding one of the stems 6b. Each of the additional stem portions 6c is substantially parallel to the head portion 6a of the corresponding support bracket.

The support brackets 6 and 6' are held, clamped or affixed to the stator 3 at their head portions by a ring or band 7, which is preferably a wide ring, and which is closed and tightened by a high speed deforming or forming process. The support brackets 6 and 6' are also held, clamped or affixed to each of the bearings 5 at their additional stem portions 6c by a pair of rings or bands 8, which are preferably narrower than the ring 7, and which are closed and tightened by a high speed deforming or forming process.

The method of manufacture of the present invention comprises positioning the rotor 2 and the pair of bearings 5 on the shaft 1. Before the bearings 5 are positioned on the shaft 1, said shaft is covered at the bearing surfaces with a film of a solid or liquid such as, for example, a lubricant, in the same thickness as the bearing clearance. The film applied to the bearing surfaces of the shaft 1 avoids end pressure of the bearings 5, since the lubricant cannot escape from the bearing clearance space because of the speed with which the rings 8 are formed on the additional stem portions 3b of the support brackets 6.

The bearings 5, and especially their outer surfaces, do not require special treatment or processing and may comprise ball bearings, friction bearings or sintered bearings. The film applied to the bearing surfaces of the shaft 1 may comprise other material than lubricant such as, for example, wax. The surfaces of the bearings 5 may be spherical, such as in calotte bearings. In such case, the surface of each of the calotte bearings is coated with a lubricant to permit adjusting movement of said bearings before the rings 8 are tightened.

Suitable spacers may be utilized to maintain the bearing clearance space between the bearing surfaces of the shaft 1 and each of the bearings 5. The spacers may comprise any suitable spacers and may be affixed to the shaft or inserted between the shaft and each of the bearings 2.

After the rotor 2 and the bearings 5 have been positioned on the shaft 1, the stator 3 is coaxially positioned around said rotor. The rotor 2 and stator 3 are suitably positioned, with a suitable air gap between them, by a plurality of spacer pins, spacer needles or any suitable spacers.

The support brackets 6 are then positioned with their head portions 6a abutting the stator 3 and with their additional stem portions 6c abutting or in near proximity with the bearings 5. The ring or band 7 is placed around the head portions 6a of the support brackets 6 over the stator 3. The rings or bands 8 are placed around the additional stem portions 6c of the support brackets 6. The rings 7 and 8 are then closed and tightened by a suitable high speed forming or deforming process.

Each of the support brackets 6 and 6' may be punched or stamped from sheet metal or may be cast or die cast from synthetic material which is plastically and elastically deformed during the high speed deforming or forming process. Each support bracket 6 and 6' is preferalby of non-magnetic material and each of the rings or bands 7 and 8 is preferably of non-magnetic material. If an annular or shell-type magnet, such as in a DC motor, is utilized as the active portion of the stator 3, the support brackets 6 and the rings 7 and 8 may comprise magnetic material so that they are included in the magnetic circuit.

One or more of the support brackets 6 may be provided with extending portions so that the motor may be affixed thereby to a supporting surface. Suitable extending portions may comprise flanges, collars, lips, arms or the like.

The high speed forming or deforming process may comprise any suitable process such as, for example, a magneform, hydro-spark or explosion process, which operates at considerably higher speeds than conventional forming or deforming processes. Due to the high speed of the forming or deforming process, the components of the motor may be produced with tolerances and will remain in position during such process.

The initial assembly of the components of the motor may be accomplished with a jig, or the like, assembly, prior to the forming process. The support brackets 6 may be initially affixed to the stator 3 by any suitable fastening means such as, for example, screws, rivets, glue, welds or the like. The relative positions of the rotor 2 and stator 3 may then be determined by spacer pins and the additional stem portions 6c of the support brackets 6 are positioned on the bearings 5. The rings 8 may then be placed around the bearings 5 and the additional stem portions 6c of the support structures 6 and closed and tightened by a high speed deforming or forming process.

While the invention has been described by means of specific examples and in a specific embodiment, I do not wish to be limited thereto, for obvious modifications will occur to those skilled in the art without departing from the spirit and scope of the invention.

I claim:
1. A method of manufacture of an electric motor, comprising the steps of
affixing a rotor to a shaft and positioning a pair of spaced bearings on opposite ends of the shaft;
positioning a stator around said rotor;
affixing support bracket means to said stator and to said bearings to affix said stator to said bearings;
positioning rings around said support bracket means around said stator and around said support bracket means around said bearings; and
closing and tightening the rings around said stator and around said bearings by a high speed forming process.

2. A method of manufacture of an electric motor as claimed in claim 1, wherein the step of positioning the stator around said rotor includes positioning spacer pins between said rotor and said stator to provide an air gap between them.

3. A method of manufacture of an electric motor as claimed in claim 1, wherein said high speed forming process is a magneform process.

4. An electric motor produced by the method of claim 1, comprising
a shaft;
a rotor coaxially affixed to said shaft;
a pair of spaced bearings positioned at the opposite ends of said shaft;
a stator coaxially positioned around said rotor with an air gap therebetween;
support bracket means affixed to said stator and to said bearings for affixing said stator to said bearings; and
rings closed and tightened around said support bracket means around said stator and around said bearings.

5. An electric motor as claimed in claim 4, wherein said support bracket means comprises a support bracket of substantially U-shaped configuration having a long head portion, a pair of relatively short spaced stems each extending substantially perpendicularly from one of the ends of said head portion and a pair of relatively short additional stem portions each extending substantially perpendicularly from the end of a corresponding one of said stems and substantially parallel to said head portion, said support bracket being affixed at its head portion to said stator and at its additional stem portions to said bearings.

6. An electric motor as claimed in claim 5, wherein said support bracket means comprises a plurality of support brackets.

7. An electric motor as claimed in claim 4, wherein each of said support bracket means and said rings comprises non-magnetic material.

8. An electric motor as claimed in claim 4, wherein each of said support bracket means and said rings comprises magnetic material.

9. An electric motor as claimed in claim 4, wherein said support bracket means comprises metal.

10. An electric motor as claimed in claim 4, wherein said support bracket means comprises synthetic material.

References Cited

UNITED STATES PATENTS

| 931,556 | 8/1909 | Balcome et al. | 310—258 X |
| 2,590,525 | 3/1952 | Esarey | 310—258 |
| 2,629,061 | 2/1953 | Swarthout | 310—42 |
| 3,145,313 | 8/1964 | Tupper | 310—42 |

WARREN E. RAY, *Primary Examiner.*

U.S. Cl. X.R.

29—421, 596; 310—43, 258